United States Patent [19]

Clausen

[11] Patent Number: 4,762,152

[45] Date of Patent: Aug. 9, 1988

[54] ASSEMBLY OF A CLOSING BAFFLE INSIDE A TUBULAR MEMBER

[75] Inventor: Edvin L. Clausen, Tonder, Denmark

[73] Assignee: Norsk Hydro A.S., Oslo, Norway

[21] Appl. No.: 934,835

[22] Filed: Nov. 19, 1986

Related U.S. Application Data

[63] Continuation of Ser. No. 776,026, Sep. 13, 1985, abandoned.

[51] Int. Cl.$^4$ .............................................. F16L 55/12
[52] U.S. Cl. ......................................... 138/89; 165/76
[58] Field of Search ............................. 138/89; 165/76

[56] References Cited

U.S. PATENT DOCUMENTS

| | | | |
|---|---|---|---|
| 2,155,491 | 4/1939 | Jacobs | 138/89 |
| 3,542,076 | 11/1970 | Richardson | 138/89 |
| 4,091,841 | 5/1978 | Beneker et al. | 138/89 |
| 4,091,842 | 5/1978 | Greenawalt et al. | 138/90 |
| 4,390,042 | 6/1983 | Kucherer et al. | 138/89 |
| 4,469,357 | 9/1984 | Martin | 138/89 X |
| 4,637,436 | 1/1987 | Stewart, Jr. et al. | 138/89 |
| 4,646,816 | 3/1987 | Rothstein | 138/89 X |

FOREIGN PATENT DOCUMENTS

| | | | |
|---|---|---|---|
| 538132 | 10/1931 | Fed. Rep. of Germany | 138/89 |
| 370711 | 4/1939 | Italy | 138/89 |

1207790 10/1970 United Kingdom .

Primary Examiner—Mark J. Thronson
Attorney, Agent, or Firm—Wenderoth, Lind & Ponack

[57] ABSTRACT

An assembly for a motor vehicle heat exchanger includes a tubular member defined by a wall having inner and outer surfaces, an internal passage defined by the inner surfaces and an open end. An integral one-piece baffle is positioned within the internal passage at a selected position spaced from the open end. The baffle has an outer cross-sectional shape complementary to the internal cross-sectional shape of the tubular member. The baffle includes a bottom forming a closed first end closing the internal passage of the tubular member and a flange integral with the bottom and extending axially therefrom toward the open end of the tubular member, the flange forming a wall of the baffle. The baffle wall is expanded outwardly to result in permanent plastic outward deformation of the wall of the tubular member and thereby deform therein a circumferential indentation. The inner and outer surfaces of the wall of the tubular member are outwardly deformed permanently at the indentation. The expanded baffle wall is firmly and permanently engaged in the indentation and thereby forms a leak-proof closure to block medium within the internal passage from reaching the open end of the tubular member.

4 Claims, 2 Drawing Sheets

ASSEMBLY OF A CLOSING BAFFLE INSIDE A TUBULAR MEMBER

This application is a continuation of application Ser. No. 776,026, filed Sept. 13, 1985, now abandoned.

FIELD OF THE INVENTION

The present invention relates to an assembly of a closing baffle inside a tubular member. The invention relates more particularly to closing baffles formed in situ inside an aluminum tube.

BACKGROUND OF THE INVENTION

Different heat exchangers employed in modern motor vehicles, e.g. condensers comprising manifold tube(s) with a plurality of U-shaped tube bends constituting a circulation path for a heat exchanging fluid, are provided with closing and partition walls within the tube. These walls (baffles) are installed in order to block or divert the flow of liquid/gas through the tube. Currently, such baffles are connected to the tubes by a brazing or soldering operation requiring use of heat and representing introduction of foreign materials (solder, flux) into the tubes. Close temperature control is necessary, especially in the case of brazing, in order to avoid an overheating and consequently collapse of the tube. Furthermore, the introduction of foreign material (fluxes) will often promote corrosion attack on the tube.

Attempts have also been made to employ mechanical methods for fastening of baffles, which rely on application of pressure forces to the outer surface of the tube, collapsing the tube wall against a plug inserted into the tube. A leakage proof connection between the tube wall and the plug requires a uniformly applied deformation force to the entire outer surface of the tube, and this is difficult to achieve in practice because of limited access to the tube surface and/or shape of the tube members.

OBJECTS OF THE INVENTION

It is therefore an object of the present invention to provide an assembly of a closing baffle inside a tubular member based upon a pure mechanical deformation of the tubular member's walls, ensuring leakage proof closure of the tubular member.

Another object of the invention is to provide a closing baffle for tubular member regardless of the shape or location of the tubular member in a heat exchanging unit and even where access to the tubular member interior is restricted only to one end.

It is contemplated that the expression tubular member means any hollow shape suitable for the intended purpose, e.g. the tubular member may comprise a hollow shape of circular, elliptical (oval) or rectangular cross-section with single or multiple cavities (voids).

SUMMARY OF THE INVENTION

The above objects of the present invention will be accomplished according to the preferred form of the invention through the provision of an assembly of a closing baffle inside a tubular member, formed by the steps of providing an expanding member in the form of a cup-shaped plug having diverging walls and a cross-section complementary-shaped to the tubular member's cross-section, attaching the baffle to an expansion mandrel by crimping of the diverging walls of the baffle around a conical head of a mandrel in a conforming die. The mandrel and the baffle are inserted into the tubular member's interior to desired location preterminated by the position of a support die attached to the mandrel. The baffle is expanded into firm engagement with the tubular member wall by withdrawal of the mandrel from the baffle.

The expansion of the walls of the baffle into the inner cross-section of the tubular member causes plastic deformation of the the tubular member such that the expanded member is firmly interlocked in an inward indentation in the tubular member wall resulting from such plastic deformation.

BRIEF DESCRIPTION OF THE DRAWINGS

Embodiments of the invention are shown by way of non restrictive examples in the accompanying drawings, where FIGS. 2a, 4a are sectional views along lines I—I of FIGS. 2, 3, 4, respectively.

DETAILED DESCRIPTION OF THE INVENTION

Figure 1:
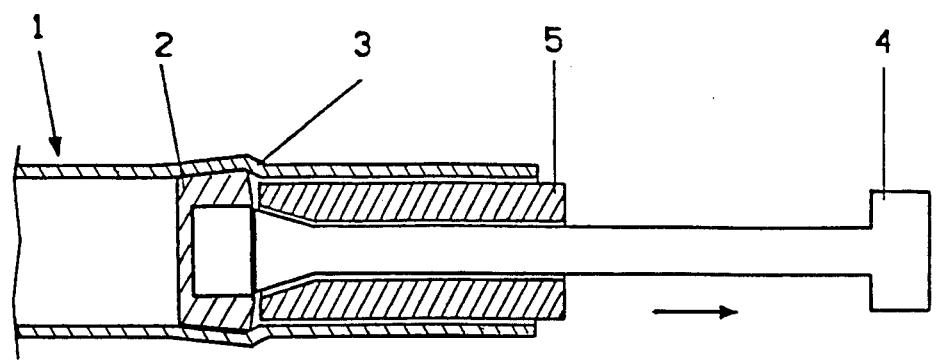
FIG. 1 is a sectional view of a closing baffle inside a tubular member.

FIG. 1 shows schematically in cross-section a tubular member (1) as a single tube, e.g. thin-walled Al-tubing, provided with a closing baffle (2) firmly interlocked in an indentation (3) running circumferentially in the tube wall. An expansion mandrel (4) carrying a support die (5) is shown during its withdrawal from the tube after having accomplished expansion of the baffle (2) and resultant plastic deformation of the tube wall resulting in formation of the indentation (3).

Figure 2:
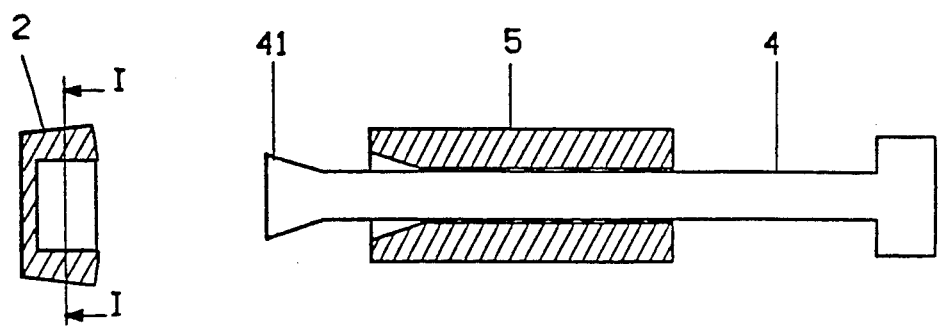
FIGS. 2–4 are schematic sectional views showing individual steps of a method of in situ forming of baffles.
Figure 2:
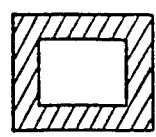
Figure 3:
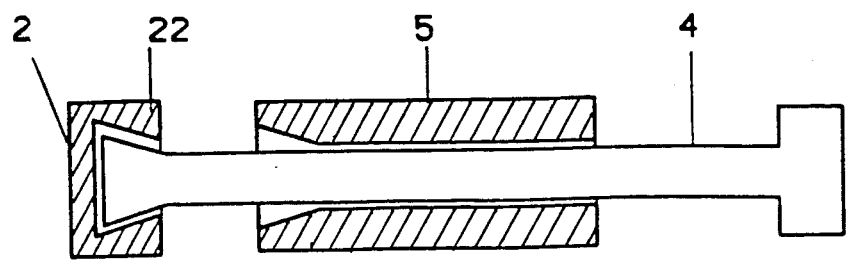
Figure 4:
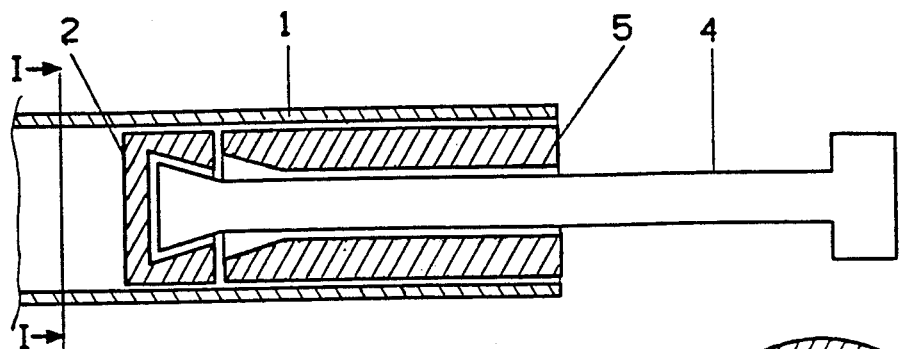

Referring to FIGS. 2–4, illustrating schematically the individual steps in the process of pre-forming, inserting and fastening of the baffle inside the tube, the baffle is shown in FIG. 2 as a cup-shaped plug having a bottom closing the tubular member and an integral flange extending axially from the bottom and forming outwardly diverging walls (22) having a cross-section complementary-shaped to the inner cross-section of the actual tubular member. The thickness of wall 22 increases axially away from the bottom. The cross-section can be circular, oval or as shown in FIG. 2a rectangular. FIG. 2a is a sectional view taken on line I—I of FIG. 2.

An expansion mandrel (4) is provided with a head part (41) designed and dimensioned so that the baffle (2) can receive head part 41 internally and by pressing into a suitable die (not shown) achieve a full encapsulation of the mandrel head part 41 by collapsing or crimping wall (22) about head part 41, see FIG. 3.

Figure 4A:
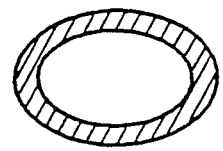

A locating or support die (5) is attached to the mandrel (4), and the entire assembled system including the baffle (2) is inserted into the tube interior and is positioned at a desired location within the tube. It is apparent from FIG. 4 that the suitable design of the support die 5 allows it also to be used as a locating or positioning device for the baffle by adapting its length and/or position with regard to the open (accessible) end of the tube. The support die is then firmly held in place, and the expansion mandrel (4) is withdrawn from the baffle, thus causing the plug walls (22) to expand uniformly against the inner surface of the tube. The free end of wall 22 is expanded by the greatest amount. The tube wall around the expanding baffle (2) is subjected to a local plastic i.e. permanent, deformation resulting in formation of a circumferential indentation (3) as shown in FIG. 1. FIG. 4a is a sectional view of the tube taken on line I—I of FIG. 4 and shows an elliptical cross-section of the tube.

Figure 5:
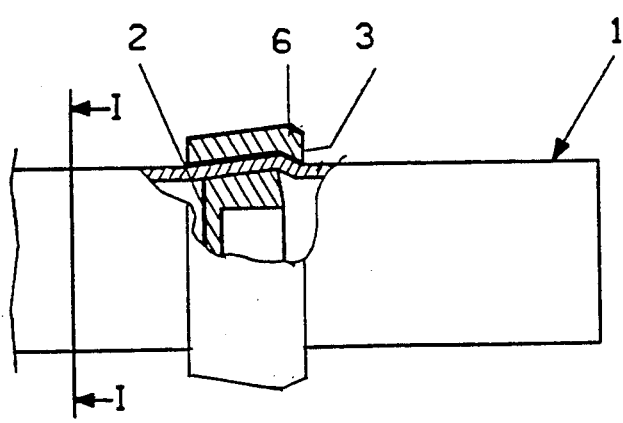
FIG. 5 is a sectional view of a variant of the closing system comprising an outside support ring on a tubular member.
Figure 5A:
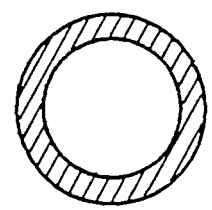
FIG. 5a is a sectional view along line I—I of FIG. 5.

The required forces holding the baffle in position can be adjusted by proper dimensional control of the baffle and/or the expansion mandrel. Furthermore, in FIG. 5 is shown an embodiment of the closing system according to the present invention where optionally an outside support ring (6) is located on the tube over the baffle (2) prior to the expansion step. By proper dimensioning and choice of material of the ring, e.g. hardened aluminum, an additional increase of the fastening forces can be achieved. FIG. 5a is a sectional viw taken on line I—I of FIG. 5, showing in this case a circular (round) cross-section of the tube.

The advantages offered by the above described closing system are obvious. Leakage proof contact between the baffle and the wall of the tubular member is achieved merely by mechanical operations without soldering/brazing or additional gluing as presently requrired by the known fastening methods. The baffle (plug) can be inserted and expanded into a firm engagement with the tubular member by entering the tubular member from one side or end only. Furthermore, the special design of the baffle and its positioning in the tubular member, as a cup-shaped plug having walls diverging in the direction of the medium flow or pressure in the tube, will ensure that with increased working pressure in the tube a tighter sealing between the tube wall and the baffle will be achieved. That is, the free end of wall 22 is expanded by the greatest amount and thereby causes the greatest outward deformation of the tubular member, whereby medium flow or pressure will urge such free end against indentation 3.

What is claimed is:

1. A motor vehicle heat exchanger manifold assembly comprising:

a tubular member defined by a wall having inner and outer surfaces, an internal passage defined by said inner surface, and an open end, whereby a heat exchange fluid medium is adapted to be directed in said internal passage in a direction toward said open end;

an integral one-piece baffle positioned within said internal passage at a selected position spaced from said open end, said baffle having an outer cross-sectional shape complementary to the internal cross-sectional shape of said tubular member, said baffle including a bottom forming a closed first end closing said internal passage of said tubular member and a hollow flange integral with said bottom and extending axially therefrom toward said open end of said tubular member, said flange forming a wall of said baffle, and said hollow flange having a vacant and unoccupied interior; and said baffle wall being mechanically expanded outwardly to result in permanent plastic outward deformation of said wall of said tubular member and thereby to form therein a circumferential indentation, said inner and outer surfaces of said wall of said tubular member being outwardly deformed permanently at said indentation, said expanded baffle wall being firmly and permanently engaged in said indentation and thereby forming a leak-proof closure to block the medium from said open end of said tubular member.

2. An assembly as claimed in claim 1, wherein said baffle wall has a thickness increasing in a direction axially away from said bottom, and said baffle wall extends into said indentation by an increasing amount in said direction axially away from said bottom.

3. An assembly as claimed in claim 1, wherein said tubular member comprises an aluminum tube.

4. An assembly as claimed in claim 1, further comprising an outer support ring surrounding said indentation and having an internal configuration complementary to the configuration of said outer surface of said tubular member at said indentation.

* * * * *